(12) United States Patent
Hiyama

(10) Patent No.: US 8,998,206 B2
(45) Date of Patent: Apr. 7, 2015

(54) MEDIUM FEEDING DIRECTION SWITCHING MECHANISM AND MEDIUM ISSUING AND COLLECTING DEVICE

(75) Inventor: Chisato Hiyama, Nagano (JP)

(73) Assignee: Nidec Sankyo Corporation (JP)

( * ) Notice: Subject to any disclaimer, the term of this patent is extended or adjusted under 35 U.S.C. 154(b) by 34 days.

(21) Appl. No.: 13/808,332

(22) PCT Filed: Jul. 1, 2011

(86) PCT No.: PCT/JP2011/065146
§ 371 (c)(1),
(2), (4) Date: Mar. 20, 2013

(87) PCT Pub. No.: WO2012/005177
PCT Pub. Date: Jan. 12, 2012

(65) Prior Publication Data
US 2014/0145396 A1    May 29, 2014

(30) Foreign Application Priority Data
Jul. 5, 2010    (JP) ................................. 2010-152606

(51) Int. Cl.
| | |
|---|---|
| *B65H 5/06* | (2006.01) |
| *B65H 29/58* | (2006.01) |
| *G06K 13/12* | (2006.01) |
| *B65H 29/12* | (2006.01) |

(52) U.S. Cl.
CPC ................ *B65H 5/062* (2013.01); *B65H 29/58* (2013.01); *G06K 13/12* (2013.01); *B65H 29/125* (2013.01); *B65H 2301/33312* (2013.01);
(Continued)

(58) Field of Classification Search
CPC ........ B65H 29/58; B65H 29/60; B65H 5/062; B65H 2404/14211
USPC ................. 271/302, 303, 304, 902, 272–274
See application file for complete search history.

(56) References Cited

U.S. PATENT DOCUMENTS

| | | | | |
|---|---|---|---|---|
| 4,256,299 | A | * | 3/1981 | Hogenson ..................... 271/262 |
| 5,723,825 | A | * | 3/1998 | Dolan et al. .................. 177/145 |

(Continued)

FOREIGN PATENT DOCUMENTS

| | | |
|---|---|---|
| JP | 8-227442 A | 9/1996 |
| JP | 11-338980 A | 12/1999 |

(Continued)

OTHER PUBLICATIONS

International Search Report for International Application No. PCT/JP20111/065146, mailed Sep. 6, 2011, with English translation.

*Primary Examiner* — Luis A Gonzalez
(74) *Attorney, Agent, or Firm* — Cantor Colburn LLP

(57) ABSTRACT

A medium transport direction switching mechanism may be provided of a simple configuration which is capable of switching the transport direction of a transported information recording medium. One end may be a biasing member for biasing a pinch roller toward a transport roller engages a support shaft which supports the pinch roller, whereas the other end of the biasing member engages a retaining member which retains the support shaft. In the medium transport direction switching mechanism, rotational behavior of the pinch roller centering upon a rotational center of the transport roller is possible between a first facing position and a second facing position, wherein the pinch roller moves to the first facing position when the transport roller rotates positively, and moves to the second facing position when the transport roller rotates negatively.

10 Claims, 6 Drawing Sheets

(52) U.S. Cl.
CPC .................. *B65H 2402/5441* (2013.01); *B65H 2404/14211* (2013.01); *B65H 2404/172* (2013.01); *B65H 2408/13* (2013.01); *B65H 2701/1914* (2013.01)

(56) References Cited

U.S. PATENT DOCUMENTS 6,186,501 B1 * 2/2001 St. Ours ........................ 271/302
6,345,760 B1 * 2/2002 Eason et al. ................... 235/380
7,823,878 B2 * 11/2010 Su et al. ........................ 271/186
8,876,111 B1 * 11/2014 Lan ............................... 271/304

FOREIGN PATENT DOCUMENTS

| JP | 2002-32717 A | 1/2002 |
| JP | 4186033 B2 | 9/2008 |
| JP | 2008-257278 A | 10/2008 |

* cited by examiner ns and a motor for turning the plate are required. In other words, in the card issuing device described in Patent Literature 1, a structure for switching a feeding direction of a carried card is complicated.
MEDIUM FEEDING DIRECTION SWITCHING MECHANISM AND MEDIUM ISSUING AND COLLECTING DEVICE

CROSS REFERENCE TO RELATED APPLICATIONS

This is a U.S. national stage of International Application No. PCT/JP2011/065146, filed on Jul. 1, 2011. Priority under 35 U.S.C. §119(a) and 35 U.S.C. §365(b) is claimed from Japanese Application No. 2010-152606, filed Jul. 5, 2010, the disclosure of which is also incorporated herein by reference.

TECHNICAL FIELD

The present invention relates to a medium feeding direction switching mechanism by which a feeding direction of a carried information recording medium is switched and relates to a medium issuing and collecting device which is provided with the medium feeding direction switching mechanism.

BACKGROUND

Conventionally, a card issuing device in which a card accommodated in a card stacker is issued has been known (see, for example, Patent Literature 1). The card issuing device described in Patent Literature 1 includes a first feed roller and a second feed roller for carrying a card. The first feed roller and the second feed roller are disposed with a predetermined distance in a feeding direction of a card. Further, the card issuing device includes a first counter roller which is oppositely disposed to the first feed roller and a second counter roller which is oppositely disposed to the second feed roller. The first counter roller and the second counter roller are rotatably supported by fixed shafts which are fixed to a plate. Further, a motor is connected with the plate through a gear train and the plate is capable of turning over a predetermined angle with a rotation center of the second feed roller as a turning center.

In the card issuing device described in Patent Literature 1, when the first and the second feed rollers are rotated in a forward direction in a state that the first feed roller and the first counter roller abut each other and the second feed roller and the second counter roller abut each other, a card is issued from a card stacker. Further, the card issuing device is provided with a function for collecting a card and, when a card is to be collected, the plate is turned in a state that a card is sandwiched between the first feed roller and the first counter roller and between the second feed roller and the second counter roller. When the plate is turned, the second counter roller is moved along the surface of the second feed roller and the first counter roller is separated from the first feed roller. Further, in this state, when the first and the second feed rollers are rotated in a reverse direction, a card sandwiched between the second feed roller and the second counter roller is collected to a lower side portion of the card issuing device. As described above, in the card issuing device described in Patent Literature 1, a feeding direction of a carried card is switched by turning the plate.

[PTL 1] Japanese Patent No. 4186033

However, in the card issuing device described in Patent Literature 1, a feeding direction of a carried card is switched by turning the plate and thus a gear train and a motor for turning the plate are required. In other words, in the card issuing device described in Patent Literature 1, a structure for switching a feeding direction of a carried card is complicated.

SUMMARY

In view of the problem described above, at least an embodiment of the present invention provides a medium feeding direction switching mechanism which is capable of switching a feeding direction of a carried information recording medium with a simple structure. Further, at least an embodiment of the present invention provides a medium issuing and collecting device which is provided with the medium feeding direction switching mechanism.

In order to solve the above problem, at least an embodiment of the present invention provides a medium feeding direction switching mechanism for switching a feeding direction of a carried information recording medium including a feed roller which is structured to abut with an information recording medium for carrying the information recording medium, a pinch roller which is oppositely disposed to the feed roller for sandwiching and carrying the information recording medium together with the feed roller, an urging member which urges the pinch roller toward the feed roller, a bearing which rotatably supports a rotation shaft rotating together with the pinch roller or a support shaft which rotatably supports the pinch roller, a first holding member which holds the urging member, and a second holding member which holds the support shaft or the bearing so that the pinch roller is capable of turning with a rotation center of the feed roller as a turning center between a first facing position where the pinch roller and the feed roller are facing each other in a predetermined first direction and a second facing position where the pinch roller and the feed roller are each other in a predetermined second direction that is inclined with respect to the first direction. One end of the urging member is engaged with the support shaft or the bearing and the other end of the urging member is engaged with the first holding member and, when the feed roller is rotated in a forward direction, the pinch roller located at the second facing position is moved to the first facing position and, when the feed roller is rotated in a reverse direction, the pinch roller located at the first facing position is moved to the second facing position.

The medium feeding direction switching mechanism in accordance with at least an embodiment of the present invention includes the feed roller, the pinch roller, and the urging member which urges the pinch roller toward the feed roller. Further, in at least an embodiment of the present invention, the pinch roller is capable of turning between the first facing position and the second facing position with the rotation center of the feed roller as a turning center. In addition, in at least an embodiment of the present invention, when the feed roller is rotated in the forward direction, the pinch roller located at the second facing position is moved to the first facing position and, when the feed roller is rotated in the reverse direction, the pinch roller located at the first facing position is moved to the second facing position.

In other words, in at least an embodiment of the present invention, when the feed roller is rotated in the reverse direction, the pinch roller located at the first facing position is moved to the second facing position by appropriately setting the friction coefficients of the feed roller, the pinch roller and the information recording medium, the urging force of the urging member and the like. Further, in at least an embodiment of the present invention, when the feed roller is rotated in the forward direction, the pinch roller located at the second facing position is moved to the first facing position by appropriately setting the friction coefficients of the feed roller, the pinch roller and the information recording medium, the urging force of the urging member and the like. Further, in at least an embodiment of the present invention, the second direction is inclined with respect to the first direction and thus, when the pinch roller is moved between the first facing position and the second facing position, a feeding direction of the information recording medium carried by the feed roller and the pinch roller is switched. Therefore, in the medium feeding direction switching mechanism according to at least an embodiment of the present invention, a feeding direction of the carried information recording medium can be switched with a simple structure with the use of the urging member.

In at least an embodiment of the present invention, it is preferable that a third facing position where the pinch roller and the feed roller are each other so that a rotation center of the feed roller, one end of the urging member and the other end of the urging member are disposed in a substantially straight line is located between the first facing position and the second facing position. According to this structure, the pinch roller can be held at the first facing position and the second facing position by the urging force of the urging member and the pinch roller is stably held at the first facing position and the second facing position. According to this structure, in a case that the friction coefficients of the feed roller, the pinch roller and the information recording medium, the urging force of the urging member and the like are appropriately set, when the feed roller is rotated in the reverse direction, the pinch roller is moved from the first facing position to the third facing position by a frictional force between the feed roller and the information recording medium, a frictional force between the pinch roller and the information recording medium and the like, or by a frictional force between the feed roller and the pinch roller and the like and, when the pinch roller has passed the third facing position, the pinch roller is moved to the second facing position mainly by the urging force of the urging member. Further, in a case that the friction coefficients of the feed roller, the pinch roller and the information recording medium, the urging force of the urging member and the like are appropriately set, when the feed roller is rotated in the forward direction, the pinch roller is moved from the second facing position to the third facing position by a frictional force between the feed roller and the information recording medium, a frictional force between the pinch roller and the information recording medium and the like, or by a frictional force between the feed roller and the pinch roller and the like and, when the pinch roller has passed the third facing position, the pinch roller is moved to the first facing position mainly by the urging force of the urging member.

In at least an embodiment of the present invention, it is preferable that the third facing position is located at a substantially middle position between the first facing position and the second facing position. According to this structure, in comparison with a case that the third facing position is displaced to the first facing position side or to the second facing position side, the friction coefficients of the feed roller, the pinch roller and the information recording medium, the urging force of the urging member and the like for moving the pinch roller from the first facing position to the third facing position, and the friction coefficients of the feed roller, the pinch roller and the information recording medium, the urging force of the urging member and the like for moving the pinch roller from the second facing position to the third facing position are easily set. Therefore, the pinch roller is easily moved between the first facing position and the second facing position.

In at least an embodiment of the present invention, for example, the second holding member is formed with a guide part for guiding the support shaft or the bearing so that the pinch roller is capable of turning with the rotation center of the feed roller as the turning center between the first facing position and the second facing position, and the first holding member is fixed to the second holding member or the first holding member is integrally formed with the second holding member. Further, in this case, it is preferable that the guide part is formed on both end sides of the support shaft or the rotation shaft. According to this structure, the support shaft or the bearing is appropriately guided between the first facing position and the second facing position by the guide part.

In at least an embodiment of the present invention, it is preferable that the medium feeding direction switching mechanism includes a sorting member which is capable of abutting with an end part in a feeding direction of the information recording medium sandwiched between the feed roller and the pinch roller when the feed roller is rotated in a reverse direction and the sorting member guides the information recording medium so that the pinch roller is moved to the second facing position. According to this structure, the pinch roller is easily moved from the first facing position to the second facing position by utilizing the sorting member.

In at least an embodiment of the present invention, the sorting member is, for example, capable of turning between a position at which the sorting member closes a first feeding path that is a feeding path for the information recording medium when the feed roller is rotated in the forward direction and a position at which the sorting member opens the first feeding path, and the sorting member is urged in a direction for closing the first feeding path and, when the feed roller is rotated in the forward direction, the information recording medium abuts the sorting member and the sorting member opens the first feeding path.

In at least an embodiment of the present invention, it is preferable that the medium feeding direction switching mechanism includes a feeding guide which structures a medium feeding passage where the information recording medium is carried. The feeding guide is formed with an escape part for preventing the information recording medium from abutting with the feeding guide when the pinch roller is moved between the first facing position and the second facing position in a state that the information recording medium is sandwiched between the feed roller and the pinch roller. According to this structure, even when the pinch roller is moved between the first facing position and the second facing position in a state that an information recording medium is sandwiched between the feed roller and the pinch roller, the pinch roller is easily moved between the first facing position and the second facing position.

The medium feeding direction switching mechanism in accordance with at least an embodiment of the present invention may be utilized in a medium issuing and collecting device which includes a medium accommodating part in which an information recording medium for being sent out toward the medium feeding direction switching mechanism is accommodated and a medium collecting part in which the information recording medium is to be collected. In the medium issuing and collecting device, when the feed roller is rotated in a forward direction, the information recording medium which is sent out from the medium accommodating part is issued and, when the feed roller is rotated in a reverse direction, the information recording medium is collected in the medium collecting part. In this case, the medium issuing and collecting device is, for example, provided with a recording and reproducing part in which recording of information is performed to the information recording medium that is sent out from the medium accommodating part and reproduction of information recorded in the information recording medium is performed. The feed roller is rotated in the forward direction or the reverse direction based on a reproduction result in the recording and reproducing part. In the medium issuing and collecting device, since a structure of the medium feeding direction switching mechanism is simplified, a structure of the medium issuing and collecting device is simplified. Therefore, the size of the medium issuing and collecting device can be reduced.

As described above, in the medium feeding direction switching mechanism in accordance with at least an embodiment of the present invention, a feeding direction of a carried information recording medium is switched with a simple structure. Further, in the medium issuing and collecting device in accordance with at least an embodiment of the present invention, since a structure of the medium feeding direction switching mechanism is simplified, a structure of the device is simplified and the size of the device is reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

Schematic Structure of Medium Issuing and Collecting Device

Figure 1:
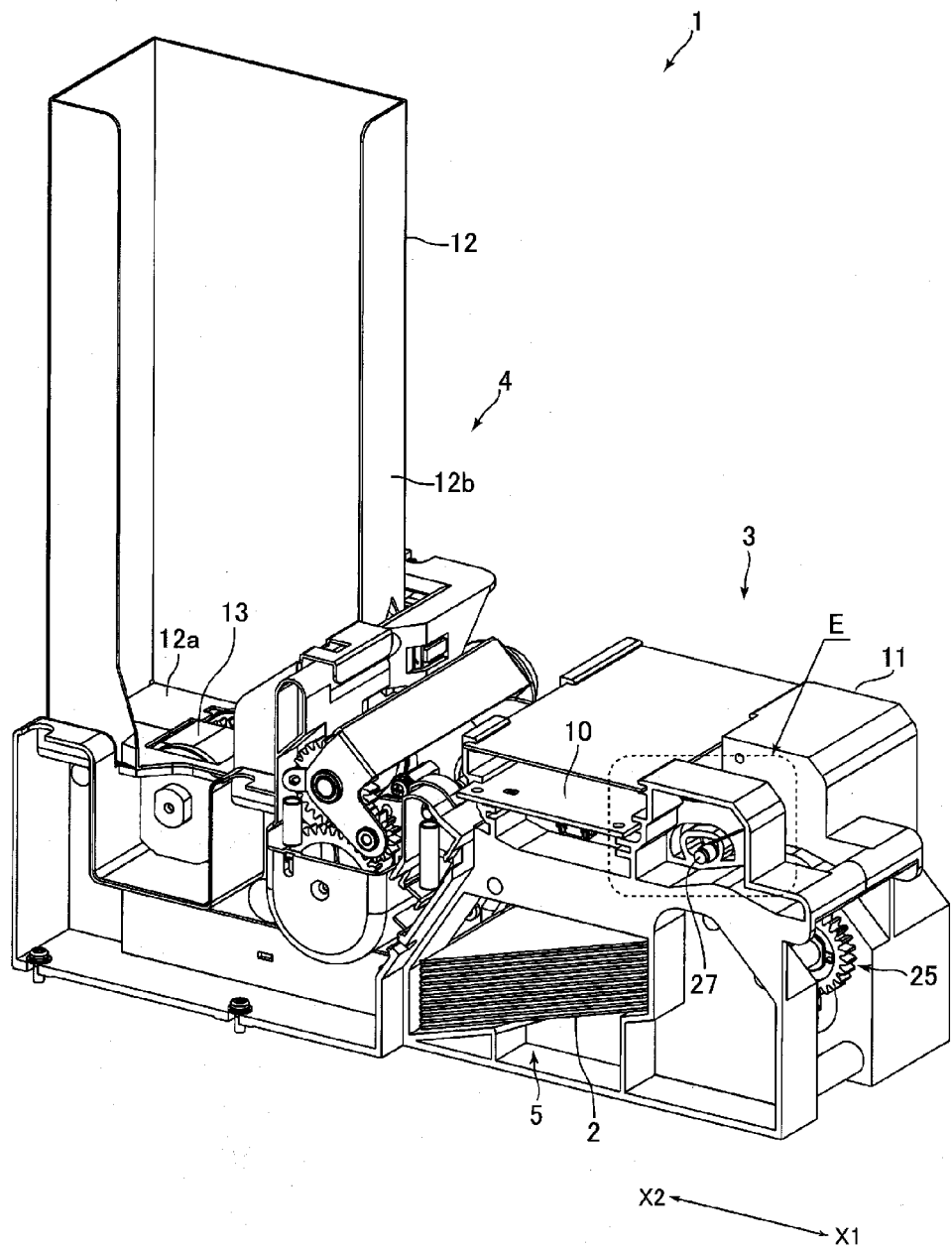
FIG. 1 is a perspective view showing a medium issuing and collecting device in accordance with an embodiment of the present invention.
Figure 2:
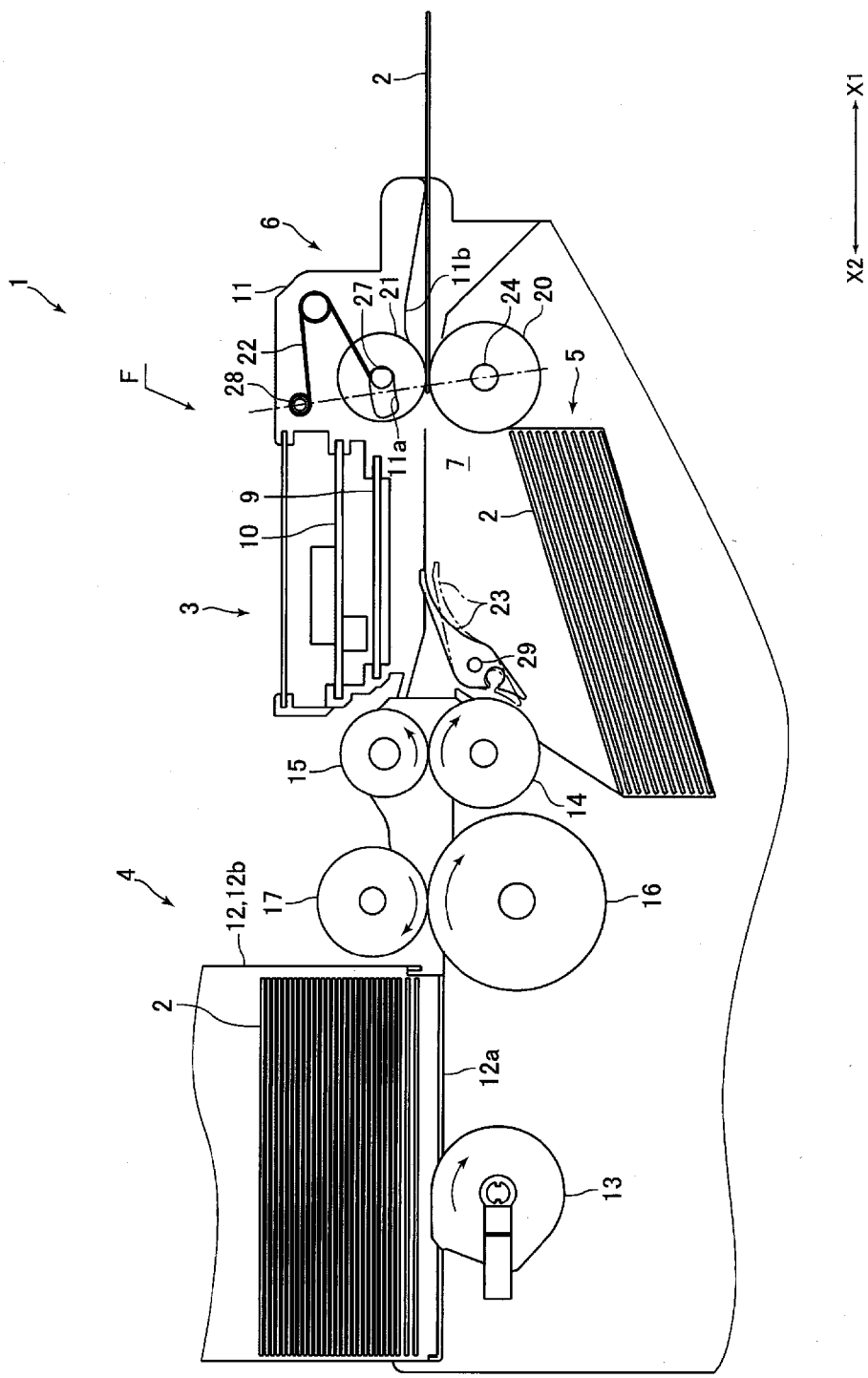
FIG. 2 is an explanatory side view showing a schematic structure of a part of the medium issuing and collecting device shown in FIG. 1.

FIG. 1 is a perspective view showing a medium issuing and collecting device 1 in accordance with an embodiment of the present invention. FIG. 2 is an explanatory side view showing a schematic structure of a part of the medium issuing and collecting device 1 shown in FIG. 1.

The medium issuing and collecting device 1 in this embodiment is provided with a card issuing function for issuing a card 2, which is an information recording medium, and a card collecting function for collecting a card 2. In this embodiment, an issued card 2 is ejected to an "X1" direction side in FIGS. 1 and 2. In the following descriptions, the "X1" direction side in FIG. 1 is set to be a "front" side in the medium issuing and collecting device 1 and an "X2" direction side which is an opposite side to the "X1" direction side is set to be a "rear" side in the medium issuing and collecting device 1.

As shown in FIGS. 1 and 2, the medium issuing and collecting device 1 includes a recording and reproducing part 3 which performs recording of information to a card 2 and reproduction of recorded information from a card 2, a card sending-out part 4 which sends out a card 2 toward the recording and reproducing part 3, a card collecting part 5 as a medium collecting part which collects a card 2, and a feeding direction switching mechanism 6 as a medium feeding direction switching mechanism in which a feeding direction of a card 2 when the card 2 is to be issued and a feeding direction of a card 2 when the card 2 is to be collected are switched.

The recording and reproducing part 3, the card collecting part 5 and the feeding direction switching mechanism 6 are disposed on the front side of the medium issuing and collecting device 1 and the card sending-out part 4 is disposed on the rear side of the medium issuing and collecting device 1. A card feeding passage 7 as a medium feeding passage where a card 2 is carried is formed in an inside of a front side portion of the medium issuing and collecting device 1.

The card 2 is, for example, a rectangular card made of vinyl chloride whose thickness is about 0.7-0.8 mm. The card 2 in this embodiment is a non-contact type IC card and the card 2 is incorporated with an antenna for communication. A magnetic stripe may be formed on the surface of the card 2 or an IC chip may be fixed to the card 2. Further, the card 2 may be a PET (polyethylene terephthalate) card whose thickness is about 0.18-0.36 mm or a paper card having a predetermined thickness.

The recording and reproducing part 3 includes an antenna 9 for communication and a control circuit board 10. The antenna 9 and the control circuit board 10 are fixed to the frame 11 which structures a front side portion of the medium issuing and collecting device 1. The card collecting part 5 is a collecting container for collecting a card 2 and a part on the lower end side of the frame 11 is structured as the card collecting part 5. A space is formed in an inside of the card collecting part 5 and collected cards 2 are stacked and accommodated in this space. The card feeding passage 7 is formed in the inside of the frame 11. The frame 11 in this embodiment is a feeding guide which structures the card feeding passage 7.

The card sending-out part 4 includes a card accommodating part 12 as a medium accommodating part in which a plurality of cards 2 before issued is stacked and accommodated in an upper and lower direction, a sending-out roller 13 for sending out a card accommodated at the lowest position among a plurality of the cards 2 accommodated in the card accommodating part 12 to a front face side of the card sending-out part 4, a sending-out roller 14 for further sending out the card 2 which is sent out by the sending-out roller 13 to the front side of the medium issuing and collecting device 1, a pad roller 15 which is oppositely disposed to the sending-out roller 14 and is urged toward the sending-out roller 14, and card separating rollers 16 and 17 for preventing two cards 2 from being sent out in a stacked state from the card accommodating part 12.

The card accommodating part 12 is formed in a rectangular box-like shape whose a part of a side face and upper face are opened. A gate through which a card 2 accommodated in the card accommodating part 12 is passed toward the front side is formed between a bottom face part 12a of the card accommodating part 12 and a lower end of its front side wall part 12b. The sending-out roller 13 is an eccentric roller and an upper end side of the sending-out roller 13 is disposed in an inside of a through hole which is formed in the bottom face part 12a. The sending-out roller 13 is connected with a motor not shown. The sending-out roller 14 is connected with a motor not shown. The pad roller 15 is disposed so as to face an upper end of the sending-out roller 14.

The card separating rollers 16 and 17 are disposed between the sending-out roller 14 and the pad roller 15 and the card accommodating part 12. Further, the card separating rollers 16 and 17 are disposed so as to be each other in the upper and lower direction. In this embodiment, the card separating roller 16 is disposed on a lower side and the card separating roller 17 is disposed on an upper side. When a card 2 is to be sent out from the card accommodating part 12, the card separating roller 16 is rotated in a direction for feeding the card 2 to the front side (in other words, in a clockwise direction in FIG. 2) and the card separating roller 17 is rotated in a direction for feeding the card 2 to the rear side (in other words, in the clockwise direction in FIG. 2). As described above, the card separating rollers 16 and 17 which are oppositely disposed to each other in the upper and lower direction are rotated in the same direction as each other and thus, when two cards 2 are sent out in a stacked state from the card accommodating part 12, a card 2 on an upper side is returned to the inside of the card accommodating part 12.

Structure of Medium Feeding Direction Switching Mechanism

Figure 3:
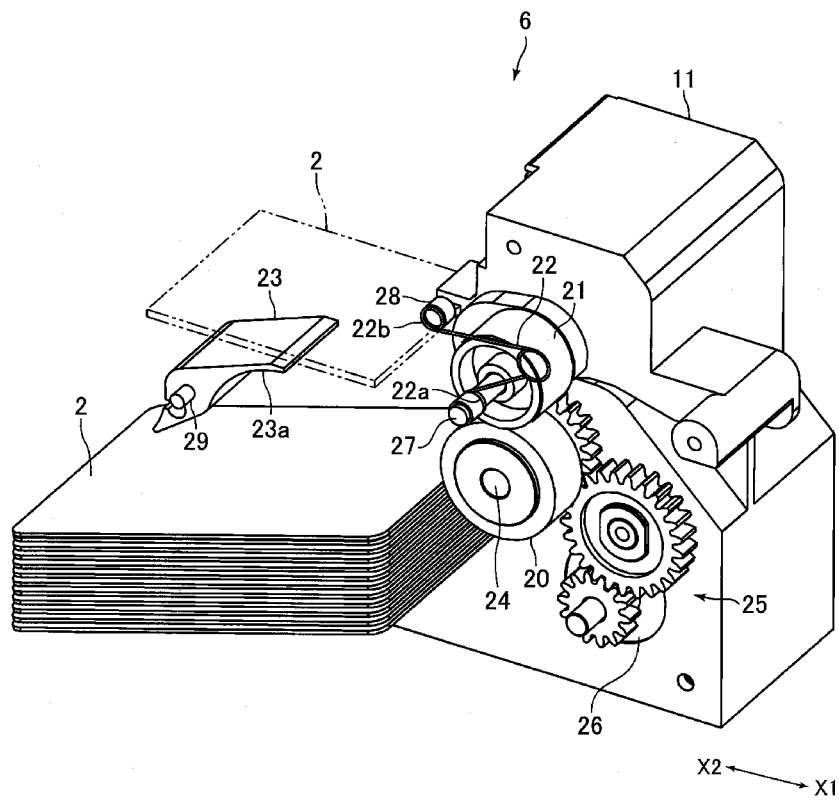
FIG. 3 is an explanatory perspective view showing a structure of a medium feeding direction switching mechanism shown in FIG. 2.
Figure 4:
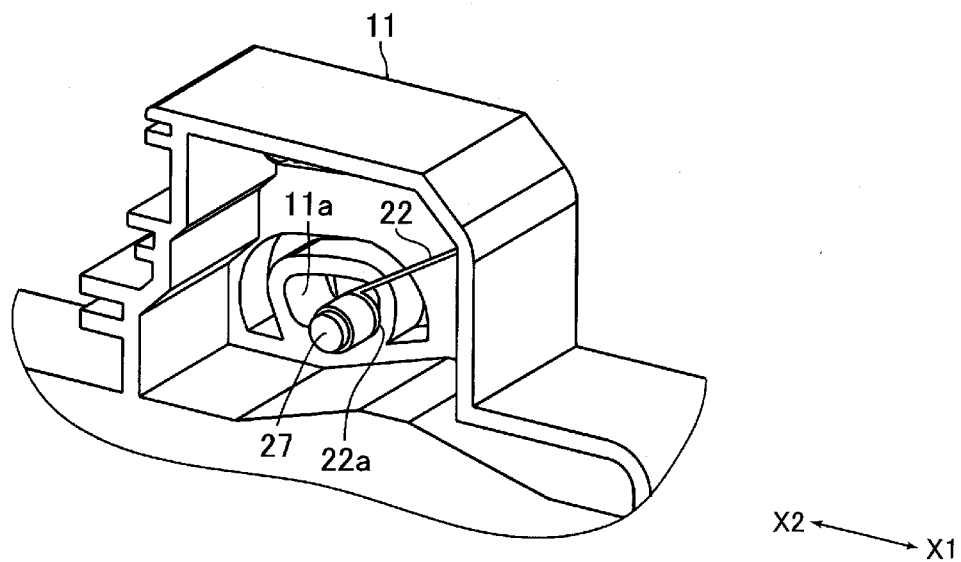
FIG. 4 is an enlarged view showing an "E" part in FIG. 1.
Figure 5:
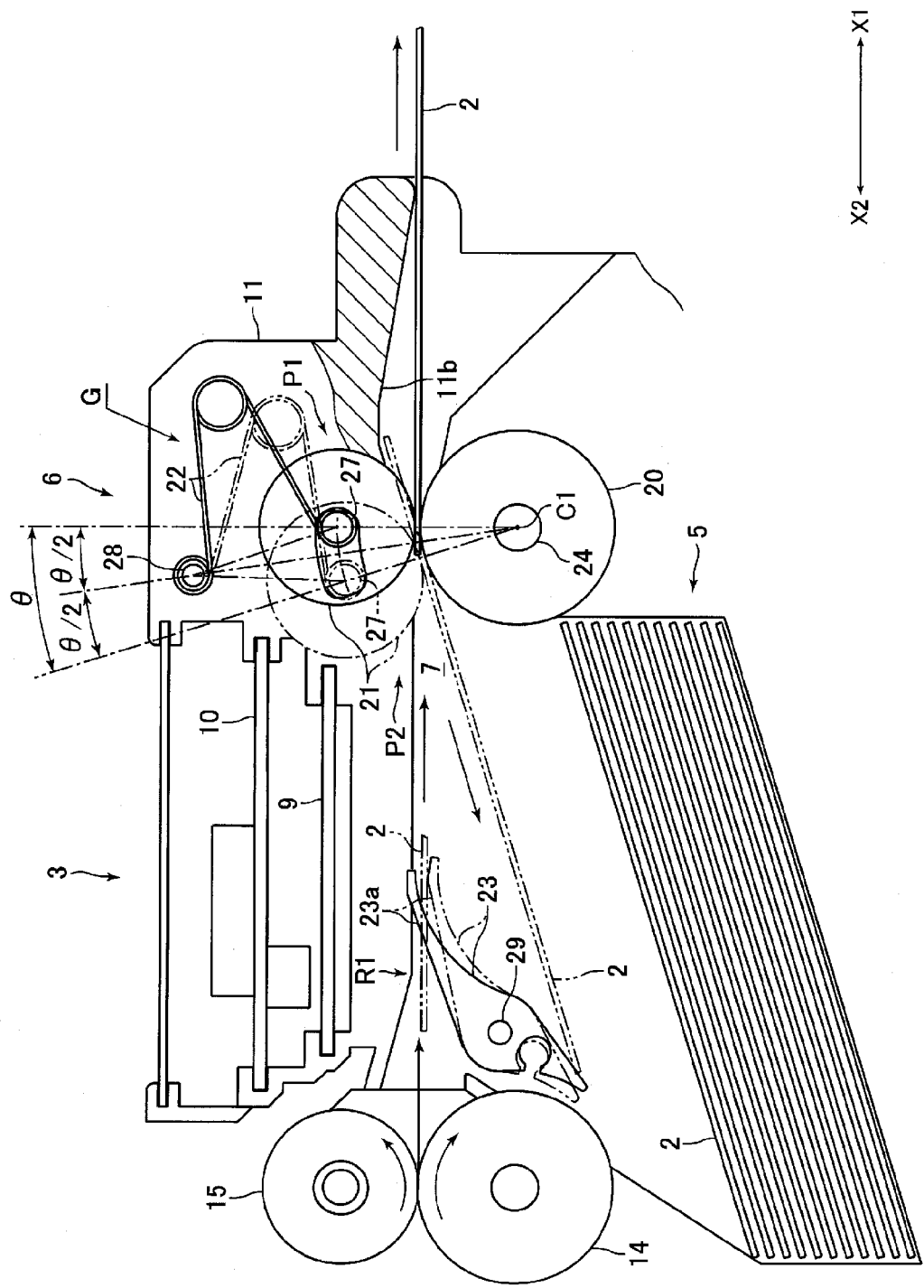
FIG. 5 is an enlarged view showing an "F" part in FIG. 2.
Figure 6:
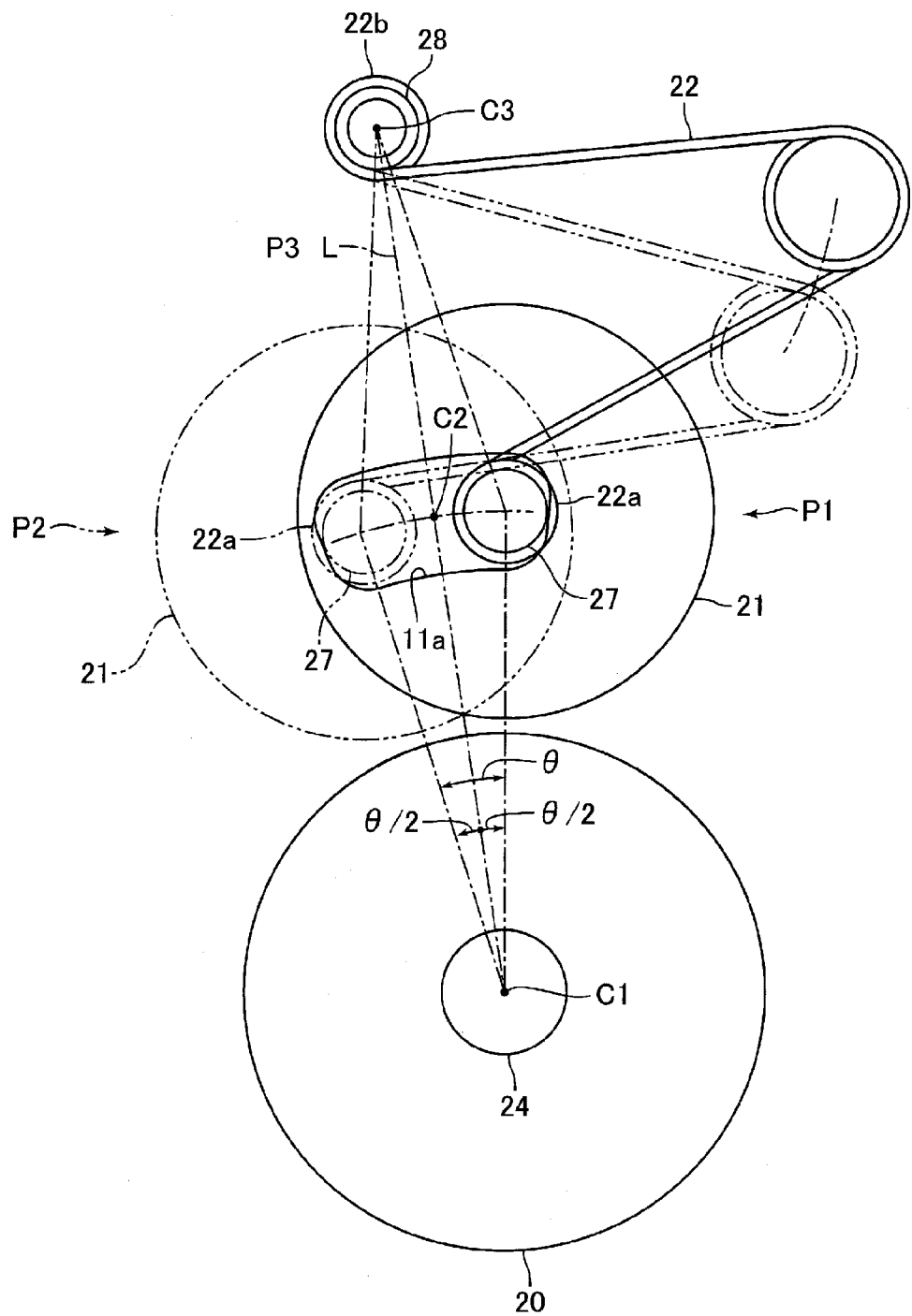
FIG. 6 is an enlarged view showing a "G" part in FIG. 5.

FIG. 3 is an explanatory perspective view showing a structure of the medium feeding direction switching mechanism 6 shown in FIG. 2. FIG. 4 is an enlarged view showing an "E" part in FIG. 1. FIG. 5 is an enlarged view showing an "F" part in FIG. 2. FIG. 6 is an enlarged view showing a "G" part in FIG. 5.

The feeding direction switching mechanism 6 includes a feed roller 20 that abuts a card 2 for carrying the card 2, a pinch roller 21 which is oppositely disposed to the feed roller 20, two torsion coil springs 22 as an urging member for urging the pinch roller 21 toward the feed roller 20, and a flapper 23 as a sorting member by which a card 2 is guided to the card accommodating part 12 when the feed roller 20 is rotated in a direction so that the card 2 is carried to the rear side.

The feed roller 20 is disposed on the front side with respect to the recording and reproducing part 3 in the front and rear direction. As shown in FIG. 3, a rotation shaft 24 to which the feed roller 20 is fixed with one gear structuring a gear train 25 and the feed roller 20 is connected with a motor 26 through the gear train 25. A distance between the feed roller 20 and the sending-out roller 14 in the front and rear direction is set to be shorter than a length in the front and rear direction of a card 2 in the medium issuing and collecting device 1.

The pinch roller 21 is urged toward the feed roller 20 from a roughly upper side by an urging force of the torsion coil spring 22 and a card 2 is sandwiched between the feed roller 20 and the pinch roller 21 and is carried by the feed roller 20 and the pinch roller 21. Further, the pinch roller 21 is rotatably supported by a support shaft 27.

Both end sides of the support shaft 27 are held by the frame 11. The frame 11 is formed with a guide groove 11*a* as a guide part into which the support shaft 27 is inserted as shown in FIG. 4. The guide groove 11*a* is formed at two positions and each of both end sides of the support shaft 27 is inserted into the guide groove 11*a*. The frame 11 in this embodiment is a second holding member which holds the support shaft 27.

A position of the pinch roller 21 is set to be a first facing position "P1" where the pinch roller 21 and the feed roller 20 are each other in the upper and lower direction as shown by the solid line in FIGS. 5 and 6. Further, a position of the pinch roller 21 is set to be a second facing position "P2" where the pinch roller 21 and the feed roller 20 are each other in an inclined state by an angle "θ" in a counterclockwise direction in FIGS. 5 and 6 with respect to the upper and lower direction (in other words, in a direction which is inclined by an angle "θ" to the rear side) as shown by the two-dot chain line in FIGS. 5 and 6. In this case, the guide groove 11*a* performs a function for guiding the support shaft 27 so that the pinch roller 21 is capable of being turned between the first facing position "P1" and the second facing position "P2" with the rotation center "C1" of the feed roller 20 as a turning center. The guide groove 11*a* is formed in a roughly rectangular shape or a roughly circular arc shape whose center is the rotation center "C1" of the feed roller 20. The angle "θ" is an acute angle. Further, the angle "θ" is a relatively small angle and, for example, in a range from about 15° to about 20°.

One end of the torsion coil spring 22 (specifically, a tip end of one arm of the torsion coil spring 22) is formed as an engagement part 22*a* which is formed in a ring shape. Further, the other end of the torsion coil spring 22 (specifically, a tip end of the other arm of the torsion coil spring 22) is formed as an engagement part 22*b* which is formed in a ring shape. In this embodiment, each of the both end sides of the support shaft 27 is inserted into the engagement part 22*a* and each of the engagement parts 22*a* is engaged with each of the both end sides of the support shaft 27. In other words, in this embodiment, the torsion coil spring 22 is disposed on each of the both end sides of the support shaft 27. A fixed shaft 28 which is fixed to the frame 11 is inserted into the engagement part 22*b* and the engagement part 22*b* is engaged with the fixed shaft 28. The engagement part 22*a* is relatively turnable with respect to the support shaft 27 and the engagement part 22*b* is relatively turnable with respect to the fixed shaft 28. The fixed shaft 28 in this embodiment is a first holding member which holds the torsion coil spring 22. The fixed shaft 28 may be integrally formed with the frame 11.

The fixed shaft 28 is disposed on an upper side with respect to the pinch roller 21. Further, as shown in FIG. 6, the fixed shaft 28 is fixed to the frame 11 so that the center "C2" of the support shaft 27 when the pinch roller 21 is located at a substantially middle position between the first facing position "P1" and the second facing position "P2" is disposed on the straight line "L" which is formed by connecting the rotation center "C1" of the feed roller 20 with the center "C3" of the fixed shaft 28. In other words, a third facing position "P3" where the pinch roller 21 and the feed roller 20 are facing each other is set between the first facing position "P1" and the second facing position "P2" so that the rotation center "C1" of the feed roller 20, the engagement part 22*a* of the torsion coil spring 22, and its engagement part 22*b* are disposed on a substantially straight line. The engagement part 22*b* of the torsion coil spring 22 is disposed on the straight line "L" which is inclined by an angle "θ/2" with respect to the upper and lower direction in the counterclockwise direction in FIG. 6. When the pinch roller 21 is located at the third facing position, the urging force of the torsion coil spring 22 becomes the maximum.

The flapper 23 is disposed on the front side with respect to the sending-out roller 14. The flapper 23 is turnably supported by a fixed shaft 29 which is fixed to the frame 11. Further, the flapper 23 is formed with a closing part 23*a* for closing a feeding path "R1" for a card 2, which is carried to the front side from the card sending-out part 4, so as to protrude from the fixed shaft 29 in a roughly oblique upper direction. In this embodiment, the flapper 23 is supported by the fixed shaft 29 so that the flapper 23 is turnable between a closing position at which the closing part 23*a* closes the feeding path "R1" as shown by the solid line in FIG. 5 and an opened position at which the closing part 23*a* opens the feeding path "R1" as shown by the two-dot chain line in FIG. 5. Further, the flapper 23 is urged in a direction in which the closing part 23a closes the feeding path "R1" (in other words, in a counterclockwise direction in FIG. 5) by an urging member not shown or by its own weight. The feeding path "R1" in this embodiment is a first feeding path.

In this embodiment, when a card 2 is to be sent out from the card sending-out part 4, the feed roller 20 is rotated in a clockwise direction in FIG. 5. Further, when the card 2 is sent out from the card sending-out part 4, the card 2 abuts an upper face side of the closing part 23a and, as shown by the two-dot chain line in FIG. 5, the closing part 23a is turned to the position where the feeding path "R1" is opened. In other words, when the feed roller 20 is rotated in the clockwise direction in FIG. 5, the card 2 abuts the upper face side of the closing part 23a to set the flapper 23 to open the feeding path "R1".

Further, in this embodiment, friction coefficients of the feed roller 20 and the pinch roller 21, an urging force of the torsion coil spring 22, the angle "θ" and the like are set so that, when the feed roller 20 is rotated in the clockwise direction in FIG. 5 in a state that the pinch roller 21 located at the second facing position "P2" abuts the feed roller 20, the pinch roller 21 is moved to the first facing position "P1" along an outer peripheral face of the feed roller 20 and, in addition, so that a force by which the pinch roller 21 located at the second facing position "P2" passes through the third facing position, a frictional force between the pinch roller 21 and the support shaft 27, and a frictional force between the feed roller 20 and the pinch roller 21 become larger in this order.

In a case that the pinch roller 21 located at the second facing position "P2" is to be moved to the first facing position "P1", the pinch roller 21 is moved from the second facing position "P2" to the third facing position by the frictional force between the feed roller 20 and the pinch roller 21 and the like and, when the pinch roller 21 has passed the third facing position, the pinch roller 21 is moved to the first facing position "P1" mainly by the urging force of the torsion coil spring 22. In other words, the pinch roller 21 is moved from the second facing position "P2" to the first facing position "P1" by utilizing a so-called toggle motion in which the third facing position is its toggle point. Further, the pinch roller 21 is hardly rotated with the support shaft 27 as a center during the pinch roller 21 is moved from the second facing position "P2" to the first facing position "P1" and, after moved to the first facing position "P1", the pinch roller 21 is rotated with the support shaft 27 as a center. Further, when the pinch roller 21 is located at the first facing position "P1", the pinch roller 21 is held at the first facing position "P1" by the urging force of the torsion coil spring 22, and the pinch roller 21 and the feed roller 20 are each other in a direction substantially perpendicular to the front and rear direction which is a feeding direction of a card 2 when the card 2 is to be issued (in other words, in the upper and lower direction).

Further, in this embodiment, the friction coefficients of the feed roller 20 and the pinch roller 21, the urging force of the torsion coil spring 22, the angle "θ" and the like are set so that, when the feed roller 20 is rotated in a counterclockwise direction in FIG. 5 in a state that a card 2 whose rear end of the card 2 is disposed on the front side with respect to the closing part 23a is sandwiched between the pinch roller 21 located at the first facing position "P1" and the feed roller 20, the pinch roller 21 is moved to the second facing position "P2" along the outer peripheral face of the feed roller 20 and, so that a force by which the pinch roller 21 located at the first facing position "P1" passes through the third facing position, the frictional force between the pinch roller 21 and the support shaft 27, and the frictional force between the feed roller 20 and the pinch roller 21 become larger in this order.

When the pinch roller 21 located at the first facing position "P1" is to be moved to the second facing position "P2", the pinch roller 21 is moved from the first facing position "P1" to the third facing position by a frictional force between the feed roller 20 and the card 2 and by a frictional force between the pinch roller 21 and the card 2 and, when the pinch roller 21 has passed the third facing position, the pinch roller 21 is moved to the second facing position "P2" mainly by the urging force of the torsion coil spring 22. In other words, the pinch roller 21 is moved from the first facing position "P1" to the second facing position "P2" by utilizing a so-called toggle motion in which the third facing position is its toggle point. Further, the pinch roller 21 is hardly rotated with the support shaft 27 as a center during the pinch roller 21 is moved from the first facing position "P1" to the second facing position "P2" and, after moved to the second facing position "P2", the pinch roller 21 is rotated with the support shaft 27 as a center. Further, when the pinch roller 21 is located at the second facing position "P2", the pinch roller 21 is held at the second facing position "P2" by the urging force of the torsion coil spring 22, and the pinch roller 21 and the feed roller 20 are each other in a direction substantially perpendicular to the feeding direction of a card 2 when the card 2 is to be collected to the card collecting part 5.

Further, when the feed roller 20 is rotated in the counterclockwise direction in FIG. 5 in a state that a card 2 is sandwiched between the pinch roller 21 and the feed roller 20, a rear end of the card 2 abuts a lower side face of the closing part 23a which closes the feeding path "R1". When the rear end of the card 2 abuts the lower side face of the closing part 23a, a moment in the counterclockwise direction in FIG. 5 is occurred on the front end side of the card 2 by an elastic force of the card 2 with the abutting part of the closing part 23a with the card 2 as a supporting point. Movement to the second facing position "P2" of the pinch roller 21 sandwiching the card 2 together with the feed roller 20 is assisted by this moment occurred on the front end side of the card 2. In other words, the flapper 23 in this embodiment performs a function for guiding a card 2 so that the pinch roller 21 is moved to the second facing position "P2". Further, in this embodiment, the flapper 23 is disposed so that, when the pinch roller 21 is moved to the second facing position "P2", the rear end side of the card 2 does not abut the lower side face of the closing part 23a.

As described above, in this embodiment, when the pinch roller 21 is turned and moved to the first facing position "P1" or the second facing position "P2" with the rotation center "C1" of the feed roller 20 as a center, the feeding direction of a card 2 is switched to an oblique direction which is inclined with respect to the front and rear direction or to the front and rear direction.

In accordance with an embodiment of the present invention, the friction coefficients of the feed roller 20 and the pinch roller 21, the urging force of the torsion coil spring 22, the angle "θ" and the like may be set so that, after the rear end of a card 2 abuts a lower side face of the closing part 23a, the pinch roller 21 is capable of passing through the third facing position by utilizing a moment occurred on the front end side of the card 2 in the counterclockwise direction in FIG. 5. In other words, the friction coefficients of the feed roller 20 and the pinch roller 21, the urging force of the torsion coil spring 22, the angle "θ" and the like may be set so that, when the feed roller 20 is rotated in the counterclockwise direction in FIG. 5, although the pinch roller 21 cannot pass through the third facing position only by the frictional force between the feed roller 20 and the card 2 and the frictional force between the pinch roller 21 and the card 2, the pinch roller 21 is capable of passing through the third facing position when the moment is occurred on the front end side of the card 2.

As shown in FIG. 5, a recessed part 11b which is recessed toward an upper side is formed on an upper face of the card feeding passage 7 on a front side with respect to the feed roller 20 and the pinch roller 21. In other words, the frame 11 is formed with the recessed part 11b. The recessed part 11b is an escape part for preventing a card 2 from abutting with the frame 11 when the feed roller 20 is rotated in the counter-clockwise direction in FIG. 5 in a state that the card 2 is sandwiched between the feed roller 20 and the pinch roller 21 and the pinch roller 21 is moved from the first facing position "P1" to the second facing position "P2".

Schematic Operation of Medium Issuing and Collecting Device

A schematic operation for issuing and collecting a card 2 in the medium issuing and collecting device 1 structured as described above will be described below. In the following descriptions, rotation of the feed roller 20 in the clockwise direction in FIG. 5 is referred to as a forward rotation and rotation of the feed roller 20 in the counterclockwise direction in FIG. 5 is referred to as a reverse rotation.

In the medium issuing and collecting device 1, when a card 2 accommodated in the card accommodating part 12 is to be issued, first, a card 2 is sent out from the card sending-out part 4 toward the recording and reproducing part 3 and the feeding direction switching mechanism 6 by the sending-out rollers 13 and 14 and the pad roller 15. The card 2 having been sent out is temporarily stopped on a lower side of the recording and reproducing part 3. In this case, a front end side of the card 2 is sandwiched between the feed roller 20 and the pinch roller 21 and a rear end side of the card 2 is sandwiched between the sending-out roller 14 and the pad roller 15.

In this state, communication is performed between an antenna incorporated into the card 2 and the antenna 9 and predetermined information is recorded in the card 2. Further, in order to confirm whether appropriate information is recorded in the card 2 or not, communication is performed between the antenna incorporated into the card 2 and the antenna 9 and the information recorded in the card 2 is reproduced. As a result of reproduction of the information, when the recorded information in the card 2 is confirmed to be the information to be recorded, the feed roller 20 is rotated in the forward direction to issue the card 2.

On the other hand, when the recorded information in the card 2 cannot be reproduced or, when the recorded information in the card 2 and the information to be recorded are not coincided with each other, the card 2 is collected. Specifically, the feed roller 20 is rotated in the forward direction until the rear end of the card 2 is disposed on the front side with respect to the closing part 23a and then, the feed roller 20 is rotated in the reverse direction. When the feed roller 20 is rotated in the reverse direction, the pinch roller 21 located at the first facing position "P1" is moved to the second facing position "P2". In this case, the movement of the pinch roller 21 to the second facing position "P2" is assisted by abutting the rear end of the card 2 with the lower side face of the closing part 23a.

Further, when the pinch roller 21 is moved to the second facing position "P2", the card 2 is carried until the front end of the card 2 is passed through between the feed roller 20 and the pinch roller 21 and, when the front end of the card 2 is passed through between the feed roller 20 and the pinch roller 21, the card 2 is collected in the card collecting part 5. When the card 2 is collected in the card collecting part 5, next card 2 is sent out from the card sending-out part 4. When the feed roller 20 is rotated in the forward direction for sending out the next card 2, the pinch roller 21 located at the first facing position "P1" is moved to the second facing position "P2".

As described above, in this embodiment, the feed roller 20 is rotated in the forward direction or the reverse direction based on a reproduced result in the recording and reproducing part 3. In accordance with an embodiment of the present invention, when a user forgets to take the issued card 2, the feed roller 20 is rotated in the reverse direction and the card 2 is collected in the card collecting part 5.

Principal Effects in this Embodiment

As described above, in this embodiment, when the feed roller 20 is rotated in the forward direction, the pinch roller 21 located at the second facing position "P2" is moved to the first facing position "P1" and is held at the first facing position "P1" by the urging force of the torsion coil spring 22. Further, when the feed roller 20 is rotated in the reverse direction, the pinch roller 21 located at the first facing position "P1" is moved to the second facing position "P2" and is held at the second facing position "P2" by the urging force of the torsion coil spring 22. Further, in this embodiment, when the pinch roller 21 is moved to the first facing position "P1" or the second facing position "P2", the feeding direction of a card 2 which is carried by the feed roller 20 and the pinch roller 21 is switched. Therefore, in this embodiment, the feeding direction of a carried card 2 is switched with a simple structure with the use of the torsion coil spring 22. Further, in this embodiment, the structure of the feeding direction switching mechanism 6 is simplified and thus the structure of the medium issuing and collecting device 1 can be simplified. Therefore, the size of the medium issuing and collecting device 1 can be reduced.

In this embodiment, the third facing position which is the toggle point is located at a substantially middle position between the first facing position "P1" and the second facing position "P2". Therefore, in comparison with a case that the third facing position is displaced to the first facing position "P1" side or to the second facing position "P2" side, the friction coefficients of the feed roller 20 and the pinch roller 21, the urging force of the torsion coil spring 22 and the like are easily set for moving the pinch roller 21 from the first facing position "P1" to the third facing position, and the friction coefficients of the feed roller 20 and the pinch roller 21, the urging force of the torsion coil spring 22 and the like are easily set for moving the pinch roller 21 from the second facing position "P2" to the third facing position. Therefore, in this embodiment, the pinch roller 21 is easily moved between the first facing position "P1" and the second facing position "P2".

In this embodiment, the flapper 23 performs a function for guiding a card 2 so that the pinch roller 21 is moved to the second facing position "P2". Therefore, the pinch roller 21 is easily moved from the first facing position "P1" to the second facing position "P2" by utilizing the flapper 23. Further, in this embodiment, the recessed part 11b is formed in the frame 11 so as to prevent a card 2 from abutting with the frame 11 when the feed roller 20 is rotated in the reverse direction in a state that a card 2 is sandwiched between the feed roller 20 and the pinch roller 21 and the pinch roller 21 is moved from the first facing position "P1" to the second facing position "P2". Therefore, the pinch roller 21 is easily moved from the first facing position "P1" to the second facing position "P2".

In this embodiment, the pinch roller 21 is turned with the rotation center "C1" of the feed roller 20 as a turning center and, when the pinch roller 21 is moved from the first facing position "P1" to the second facing position "P2", the feeding direction of a card 2 is switched. Further, the flapper 23 is disposed so that, when the pinch roller 21 is moved to the second facing position "P2", the rear end side of the card 2 does not abut the lower side face of the closing part 23a. Therefore, when the feeding direction of a card 2 is to be switched and, after the feeding direction of the card 2 is switched, the card 2 sandwiched between the pinch roller 21 and the feed roller 20 is hardly resiliently bent. Accordingly, in this embodiment, damage of an antenna incorporated into a card 2 which is occurred due to a bending stress of the card 2 can be prevented.

In this embodiment, the guide groove 11a is formed on both end sides of the support shaft 27. Further, the torsion coil spring 22 is disposed at each of the both end sides of the support shaft 27. Therefore, the support shaft 27 can be moved in a well balanced manner between the first facing position "P1" and the second facing position "P2" by the guide grooves 11a and the torsion coil springs 22 which are disposed on the both end sides of the support shaft 27 and thus the support shaft 27 is easily moved.

Other Embodiments

Although the present invention has been shown and described with reference to a specific embodiment, various changes and modifications will be apparent to those skilled in the art from the teachings herein.

Figure 7:
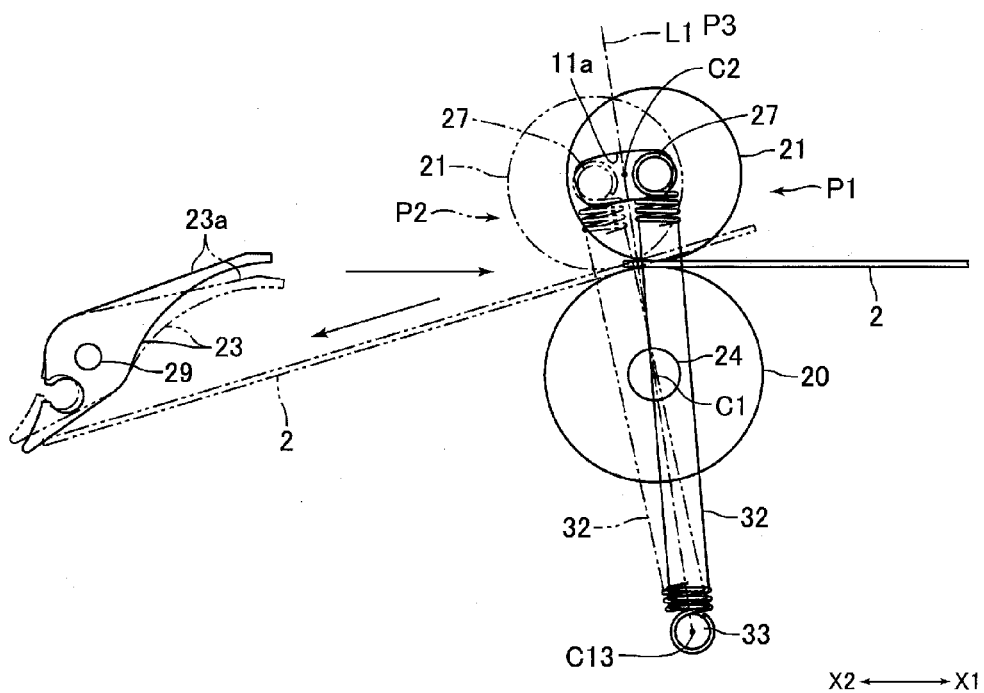
FIG. 7 is an explanatory view showing an urging member in accordance with another embodiment of the present invention.

In the embodiment described above, the urging member which urges the pinch roller 21 toward the feed roller 20 is a torsion coil spring 22. However, the present invention is not limited to this embodiment. For example, the urging member which urges the pinch roller 21 toward the feed roller 20 may be a tension coil spring 32 as shown in FIG. 7. In this case, one end of the tension coil spring 32 is relatively turnably attached to the support shaft 27 and the other end of the tension coil spring 32 is relatively turnably attached to a fixed shaft 33 which is a first holding member that is fixed to the frame 11 on a lower side with respect to the feed roller 20. Further, the fixed shaft 33 is fixed to the frame 11 so that the center "C2" of the support shaft 27 when the pinch roller 21 is located at a substantially middle position between the first facing position "P1" and the second facing position "P2" is disposed on the straight line "L1", in other words, at a third facing position "P3", which is formed by connecting the rotation center "C1" of the feed roller 20 with the center "C13" of the fixed shaft 33.

Figure 8:
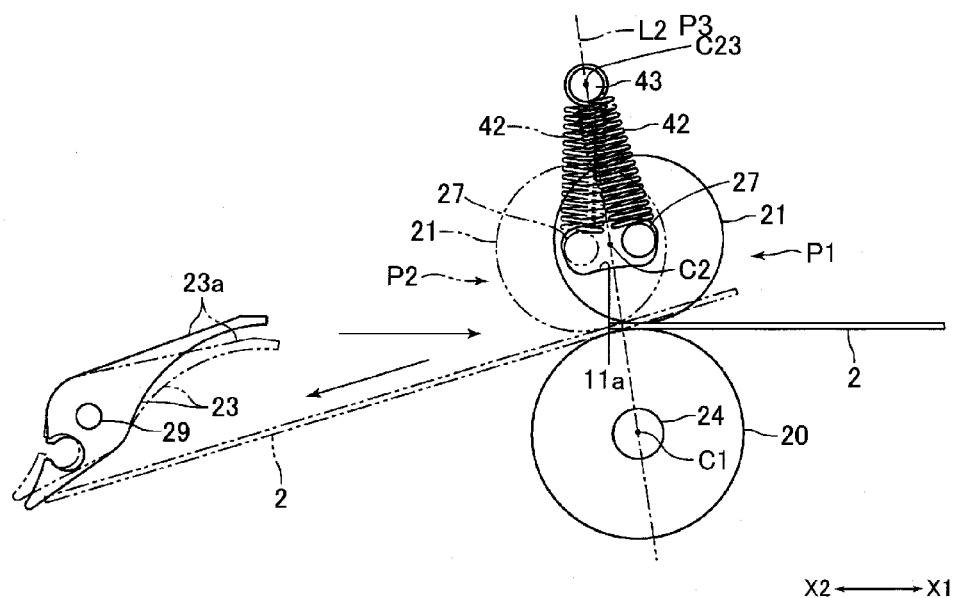
FIG. 8 is an explanatory view showing an urging member in accordance with another embodiment of the present invention.

Further, the urging member which urges the pinch roller 21 toward the feed roller 20 may be a compression coil spring 42 as shown in FIG. 8. In this case, one end of the compression coil spring 42 abuts the support shaft 27 and the other end of the compression coil spring 42 is relatively turnably attached to the fixed shaft 43 which is a first holding member fixed to the frame 11 on an upper side with respect to the pinch roller 21. Further, the fixed shaft 43 is fixed to the frame 11 so that the center "C2" of the support shaft 27 when the pinch roller 21 is located at a substantially middle position between the first facing position "P1" and the second facing position "P2" is disposed on the straight line "L2", in other words, at a third facing position "P3", which is formed by connecting the rotation center "C1" of the feed roller 20 with the center "C23" of the fixed shaft 43. When the urging member is a compression coil spring 42, a guide part is required for preventing buckling of the compression coil spring 42.

Further, the urging member which urges the pinch roller 21 toward the feed roller 20 may be another type of spring member or may be an elastic member such as rubber.

In the embodiment described above, the support shaft 27 which supports the pinch roller 21 is held by the frame 11. However, the present invention is not limited to this embodiment. For example, the support shaft 27 may be held by a lever member which is capable of turning with the rotation center "C1" of the feed roller 20 as a turning center. In this case, for example, the support shaft 27 is fixed to one end side of the lever member and the other end side of the lever member is turnably held by the rotation shaft 24. In this case, the pinch roller 21 is easily moved between the first facing position "P1" and the second facing position "P2" by utilizing a frictional force between the rotation shaft 24 and the lever member. Further, in this case, a side face of the lever member and a side face of the feed roller 20 may be contacted with each other in a pressed manner. According to this structure, the pinch roller 21 is further easily moved between the first facing position "P1" and the second facing position "P2" by utilizing the frictional force between the side face of the lever member and the side face of the feed roller 20.

Further, in this case, similarly to the embodiment described above, a turning range of the lever member may be restricted by the support shaft 27 inserted into the guide groove 11a and the guide groove 11a so that the lever member is turned between the first facing position "P1" and the second facing position "P2". Alternatively, a stopper member restricting a turning range of the lever member may be provided so that the lever member is turned between the first facing position "P1" and the second facing position "P2". Further, in this case, the lever member is a second holding member which holds the support shaft 27.

In the embodiment described above, the third facing position where the pinch roller 21 and the feed roller 20 are each other is located at a substantially middle position between the first facing position "P1" and the second facing position "P2" so that the rotation center "C1" of the feed roller 20, the engagement part 22a and the engagement part 22b of the torsion coil spring 22 are disposed in a substantially straight line. However, the present invention is not limited to this embodiment. For example, the third facing position may be displaced to the first facing position "P1" side or may be displaced to the second facing position "P2" side.

Further, the third facing position may be coincided with the first facing position "P1" or may be coincided with the second facing position "P2". When the third facing position is coincided with the first facing position "P1", the pinch roller 21 is in an unstable state at the first facing position "P1" and may be easily returned to the second facing position "P2". Further, in a case that the third facing position is coincided with the second facing position "P2", the pinch roller 21 is in an unstable state at the second facing position "P2" and may be easily returned to the first facing position "P1". However, also in these cases, when the friction coefficients of the feed roller 20 and the pinch roller 21, the urging force of the torsion coil spring 22, the angle "θ" and the like are appropriately set, similarly to the embodiment described above, the feeding direction of a carried card 2 can be switched with a simple structure with the use of the torsion coil spring 22.

In addition, the fixed shaft 28 may be fixed to the frame 11 so that the straight line "L" connecting the rotation center "C1" of the feed roller 20 with the center "C3" of the fixed shaft 28 is disposed on the clockwise direction side in FIG. 6 with respect to the line connecting the center "C2" of the support shaft 27 with the rotation center "C1" of the feed roller 20 when the pinch roller 21 is located at the first facing position "P1". In this case, the pinch roller 21 is urged to the second facing position "P2" side by the urging force of the torsion coil spring 22. Further, in this case, when the feed roller 20 is rotated in the forward direction, the pinch roller 21 located at the second facing position "P2" is moved to the first facing position "P1". Alternatively, the fixed shaft 28 may be fixed to the frame 11 so that the straight line "L" connecting the rotation center "C1" of the feed roller 20 with the center "C3" of the fixed shaft 28 is disposed on the counterclockwise direction side in FIG. 6 with respect to the line connecting the center "C2" of the support shaft 27 with the rotation center "C1" of the feed roller 20 when the pinch roller 21 is located at the second facing position "P2". In this case, the pinch roller 21 is urged to the first facing position "P1" side by the urging force of the torsion coil spring 22. Further, in this case, when the feed roller 20 is rotated in the reverse direction, the pinch roller 21 located at the first facing position "P1" is moved to the second facing position "P2". Also in these cases, when the friction coefficients of the feed roller 20 and the pinch roller 21, the urging force of the torsion coil spring 22, the angle "θ" and the like are appropriately set, similarly to the embodiment described above, the feeding direction of a carried card 2 can be switched with a simple structure with the use of the torsion coil spring 22.

In the embodiment described above, the feeding direction switching mechanism 6 is provided with the flapper 23. However, in a case that, when the feed roller 20 is rotated in the reverse direction, the pinch roller 21 is surely moved to the second facing position "P2" so that a card 2 is surely collected in the card collecting part 5, the feeding direction switching mechanism 6 may be provided with no flapper 23.

In the embodiment described above, the pinch roller 21 is rotatably supported by the support shaft 27. However, the present invention is not limited to this embodiment. For example, the pinch roller 21 may be fixed to a rotation shaft rotating together with the pinch roller 21 or the pinch roller 21 may be integrally formed with a rotation shaft rotating together with the pinch roller 21. In this case, the rotation shaft is a support shaft for rotatably supporting the pinch roller and, for example, a bearing which rotatably supports the rotation shaft is held by the frame 11. Further, in this case, an end of the torsion coil spring 22 is engaged with the bearing and a guide part for guiding the bearing between the first facing position "P1" and the second facing position "P2" is formed in the frame 11.

In the embodiment described above, the medium issuing and collecting device 1 collects a card 2 which is sent out from the card sending-out part 4 as needed. However, the present invention is not limited to this embodiment. For example, the medium issuing and collecting device 1 may collect a card 2 which is inserted from the outside as needed. Further, in the embodiment described above, the recording and reproducing part 3 is provided with the antenna 9 for communication. However, the recording and reproducing part 3 may be provided with a magnetic head and/or an IC contact instead of the antenna 9 or in addition to the antenna 9.

In the embodiment described above, the medium issuing and collecting device 1 having an issuing function and a collecting function of a card 2 is described as an example of a structure of the feeding direction switching mechanism 6 in accordance with an embodiment of the present invention. However, the feeding direction switching mechanism 6 may be utilized in various devices in which switching of the feeding direction of a card 2 is required.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium feeding direction switching mechanism for switching a feeding direction of a carried information recording medium, the medium feeding direction switching mechanism comprising:
    a feed roller that abuts an information recording medium to carry the information recording medium;
    a pinch roller which is oppositely disposed to the feed roller and configured to sandwich and carry the information recording medium together with the feed roller;
    an urging member configured to urge the pinch roller toward the feed roller;
    a support shaft structured to rotatably support the pinch roller;
    a first holding member configured to hold the urging member; and
    a second holding member configured to hold the support shaft so that the pinch roller is turnable with a rotation center of the feed roller as a turning center between a first facing position where the pinch roller and the feed roller are facing each other in a predetermined first direction and a second facing position where the pinch roller and the feed roller are facing each other in a predetermined second direction that is inclined with respect to the first direction through a third facing position which is located between the first facing position and the second facing position, the third facing position being a position at which the rotation center of the feed roller, the first end of the urging member, and the second end of the urging member are disposed in a substantially straight line;
    wherein a first end of the urging member is engaged with the support shaft and a second end of the urging member is engaged with the first holding member; and
    wherein the feed roller, the pinch roller and the urging member are configured such that when the feed roller is rotated in a forward direction, the pinch roller located at the second facing position is moved toward the third facing position against an urging force of the urging member by a frictional force generated between the pinch roller and the feed roller by the urging member and, after passing the third facing position, the pinch roller is moved to the first facing position by utilizing the urging force of the urging member and, when the feed roller is rotated in a reverse direction, the pinch roller located at the first facing position is moved toward the third facing position against the urging force of the urging member by the frictional force generated between the pinch roller and the feed roller by the urging member and, after passing the third facing position, the pinch roller is moved to the second facing position by utilizing the urging force of the urging member.

2. The medium feeding direction switching mechanism according to claim 1, wherein the third facing position is located at a substantially middle position between the first facing position and the second facing position.

3. The medium feeding direction switching mechanism according to claim 1, wherein the second holding member is formed with a guide part configured to guide the support shaft so that the pinch roller is turnable with the rotation center of the feed roller as the turning center between the first facing position and the second facing position, and the first holding member is fixed to the second holding member or is integrally formed with the second holding member.

4. The medium feeding direction switching mechanism according to claim 3, wherein the guide part is formed on both end sides of the support shaft or the rotation shaft.

5. The medium feeding direction switching mechanism according to claim 1, further comprising a sorting member that abuts an end part in a feeding direction of the information recording medium that is sandwiched between the feed roller and the pinch roller and of guiding the information recording medium so that the pinch roller is moved to the second facing position when the feed roller is rotated in a reverse direction.

6. The medium feeding direction switching mechanism according to claim 5, wherein the sorting member is turnable between a position at which the sorting member closes a first feeding path that is a feeding path for the information recording medium when the feed roller is rotated in the forward direction and a position at which the sorting member opens the first feeding path, the sorting member is urged in a direction for closing the first feeding path, and when the feed roller is rotated in the forward direction, the information recording medium abuts the sorting member to cause the sorting member to open the first feeding path.

7. The medium feeding direction switching mechanism according to claim 1, further comprising a feeding guide which structures a medium feeding passage where the information recording medium is carried, wherein the feeding guide is formed with an escape part for preventing the information recording medium from abutting with the feeding guide when the pinch roller is moved between the first facing position and the second facing position in a state that the information recording medium is sandwiched between the feed roller and the pinch roller.

8. The medium feeding direction switching mechanism according to claim 1, wherein the frictional force generated between the pinch roller and the feed roller by the urging member is set to be larger than a force which is required to pass the pinch roller located at the second facing position through the third facing position, and the frictional force is set to be larger than a force which is required to pass the pinch roller located at the first facing position through the third facing position.

9. A medium issuing and collecting device comprising:
a medium feeding direction switching mechanism for switching a feeding direction of a carried information recording medium, the medium feeding direction switching mechanism comprising:

a feed roller that abuts an information recording medium to carry the information recording medium;

a pinch roller which is oppositely disposed to the feed roller and configured to sandwich and carry the information recording medium together with the feed roller;

an urging member configured to urge the pinch roller toward the feed roller;

a support shaft structured to rotatably support the pinch roller;

a first holding member configured to hold the urging member; and a second holding member configured to hold the support shaft so that the pinch roller turnable with a rotation center of the feed roller as a turning center between a first facing position where the pinch roller and the feed roller are facing each other in a predetermined first direction and a second facing position here the pinch roller and the feed roller are facing each other in a predetermined second direction that is inclined with respect to the first direction;

wherein a first end of the urging member is engaged with the support shaft and a second end of the urging member is engaged with the first holding member; and wherein the feed roller and the pinch roller are configured such that when the feed roller is rotated in a forward direction, the pinch roller located at the second facing position is moved to the first facing position and, when the feed roller is rotated in a reverse direction, the pinch roller located at the first facing position is moved to the second facing position;

a medium accommodating part in which an information recording medium for being sent out toward the medium feeding direction switching mechanism is accommodated; and a medium collecting part in which the information recording medium is to be collected;

wherein when the feed roller is rotated in a forward direction, the information recording medium which is sent out from the medium accommodating part is issued and, when the feed roller is rotated in a reverse direction, the information recording medium is collected in the medium collecting part.

10. The medium issuing and collecting device according to claim 9, further comprising a recording and reproducing part in which recording of information is performed to the information recording medium that is sent out from the medium accommodating part and reproduction of information recorded in the information recording medium is performed, wherein the feed roller is rotated in the forward direction or the reverse direction based on a reproduction result in the recording and reproducing part.

* * * * *